(12) United States Patent
Freeman (10) Patent No.: US 10,174,892 B2
(45) Date of Patent: Jan. 8, 2019

(54) CONSTRUCTION SITE LIGHT AND CABLE SYSTEM

(71) Applicant: Jonathan E. Freeman, Spartanburg, SC (US)

(72) Inventor: Jonathan E. Freeman, Spartanburg, SC (US)

(73) Assignee: Jonathan Freeman, Spartanburg, SC (US)

( * ) Notice: Subject to any disclaimer, the term of this patent is extended or adjusted under 35 U.S.C. 154(b) by 402 days.

(21) Appl. No.: 15/051,739

(22) Filed: Feb. 24, 2016

(65) Prior Publication Data
US 2017/0241603 A1    Aug. 24, 2017

(51) Int. Cl.
| | |
|---|---|
| *H04M 1/22* | (2006.01) |
| *F21S 8/04* | (2006.01) |
| *F21V 21/008* | (2006.01) |
| *F21V 21/088* | (2006.01) |
| *F21V 23/02* | (2006.01) |
| *F21V 27/00* | (2006.01) |
| *F21V 33/00* | (2006.01) |
| *H04R 1/02* | (2006.01) |

(Continued)

(52) U.S. Cl.
CPC .............. *F21S 8/043* (2013.01); *F16B 2/065* (2013.01); *F16L 3/02* (2013.01); *F16L 3/14* (2013.01); *F16L 3/227* (2013.01); *F16L 3/24* (2013.01); *F16M 13/022* (2013.01); *F21S 8/046* (2013.01); *F21S 8/063* (2013.01); *F21V 21/008* (2013.01); *F21V 21/088* (2013.01); *F21V 21/0832* (2013.01); *F21V 23/001* (2013.01); *F21V 23/02* (2013.01); *F21V 27/00* (2013.01); *F21V 33/0056* (2013.01); *H04R 1/026* (2013.01); *H04R 1/028* (2013.01); *F21W 2131/402* (2013.01); *H04R 2420/07* (2013.01)

(58) Field of Classification Search
CPC . F21S 8/043; F21S 8/046; F21S 8/063; F16B 2/065; F16M 13/022; F21V 23/02; F21V 27/00; F21V 21/088; F21V 21/008; F21V 23/001; F21V 21/0832; F21V 33/0056; F16L 3/24; F16L 3/227; F16L 3/02; F16L 3/14; H04R 2420/07; H04R 1/026; H04R 1/028; F21W 2131/402
USPC .......................................................... 362/86
See application file for complete search history.

(56) References Cited

U.S. PATENT DOCUMENTS

| | | | | |
|---|---|---|---|---|
| 4,230,297 A | * | 10/1980 | Comer | ..................... F21V 21/02 |
| | | | | 248/317 |
| 5,700,980 A | * | 12/1997 | Bello | ....................... H02G 7/12 |
| | | | | 174/146 |

(Continued)

FOREIGN PATENT DOCUMENTS

| | | | | |
|---|---|---|---|---|
| GB | 2500049 A | * | 9/2013 | ............... H02G 3/30 |
| KR | 20010093978 A | | 10/2001 | |

OTHER PUBLICATIONS

"I-beam", Wikipedia entry, https://en.wikipedia.org/wiki/I-beam, Nov. 11, 2015.

*Primary Examiner* — Anh Mai
*Assistant Examiner* — Glenn Zimmerman
(74) *Attorney, Agent, or Firm* — James G. Passé; Passé Intellectual Property, LLC (57) ABSTRACT

The present invention shows a system for hanging lights and cable hooks from an I-beam overhead girder in a construction site for the purpose of getting lights and cables off the floor in order to meet construction regulations.

27 Claims, 6 Drawing Sheets

(51) Int. Cl.

| | |
|---|---|
| *F21V 23/00* | (2015.01) |
| *F21V 21/08* | (2006.01) |
| *F16L 3/14* | (2006.01) |
| *F16L 3/24* | (2006.01) |
| *F16L 3/02* | (2006.01) |
| *F16L 3/227* | (2006.01) |
| *F16M 13/02* | (2006.01) |
| *F16B 2/06* | (2006.01) |
| *F21S 8/06* | (2006.01) |
| *F21W 131/402* | (2006.01) |

(56) References Cited

U.S. PATENT DOCUMENTS

| | | | | |
|---|---|---|---|---|
| 6,428,181 | B1* | 8/2002 | Moriarty | B25H 3/02 |
| | | | | 362/154 |
| 6,971,768 | B1* | 12/2005 | Pepito | F21S 4/10 |
| | | | | 362/238 |
| 9,216,307 | B2* | 12/2015 | Liu | E04G 21/32 |
| 2004/0113024 | A1* | 6/2004 | Caveney | H02G 3/0456 |
| | | | | 248/49 |
| 2012/0066984 | A1* | 3/2012 | Thompson | E04D 1/18 |
| | | | | 52/11 |
| 2013/0320157 | A1* | 12/2013 | Carter | F16L 3/12 |
| | | | | 248/68.1 |

* cited by examiner

CONSTRUCTION SITE LIGHT AND CABLE SYSTEM

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a building construction site light and cable system. In particular, it relates to a light and cable system that hangs from an overhead I-beam, pipes, and/or wood beams in the construction site, and provides lights, cable holders, electrical outlets and other items.

Description of Related Art

The construction of a building, especially the construction of a commercial building, runs into several safety problems during construction. Light needs to be provided before fixtures are in place, outlets need to be provided before they are available, and power cords for equipment, electricity, compressors and the like are required to be off the floor, where they are out of the way of workers and others walking around. In addition, communication between workers is necessary.

While some devices for holding cables are known, and certainly lights and outlets are well-known, providing them all at once presents a problem, and frequently means use of several devices. In some cases, it means jury rigging a number of different ways of getting equipment cables out of the way. As regulations continue to tighten, there needs to be a better means, especially in commercial construction sites, to provide organization for these construction needs. Construction sites frequently have overhead I-beams, pipes and/or wood beams.

BRIEF SUMMARY OF THE INVENTION

The present invention provides a device which attaches to an overhead I-beam, pipe or wood beam in a building construction setting and therefrom hangs cable holders, lights and receptacles and/or power cords, in order to overcome the obstacles currently endured in commercial and residential construction.

Accordingly, in one embodiment, there is a light and cable system for use in a construction site, having at least one of an overhead I-beam, an overhead pipe, or an overhead wood beam, the I-beam having an upper and lower flange, the system comprising:
  a) a device for attaching the system to: at least one of the lower flange of the I-beam, the pipe, and the wood beam;
  b) hanging a device from the attaching device comprising one or more each of:
    i. at least one electric light;
    ii. hooks for holding cable; and
    iii. an electric outlet; and
  c) a device for adding at least one of AC or DC power to the system.

DETAILED DESCRIPTION OF THE INVENTION

While this invention is susceptible to embodiment in many different forms, there is shown in the drawings, and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

DEFINITIONS

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitations thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein, the term "light and cable system" refers to a device for providing electric light (AC or DC) and for holding cable, and other items, off the floor, in a construction site in a temporary manner. Once the construction is completed, the cables and system are removed and utilized at the next site. Other items include: electrical outlets, a Wi-Fi hub, speakers (for communication or music, etc.), and the like. In one embodiment, communication systems are made wirelessly through use of Wi-Fi and use of speakers.

As used herein, the term "construction site" refers to the construction of a building wherein there are overhead I-beams, pipes, and/or wood beams, that are exposed during the construction of the building.

As used herein, the term "I-beam" refers to a structural steel beam used in construction having an I or H-shaped cross section. They are utilized for carrying heavy loads like floors. "Pipes" are overhead pipes, strong enough to hang the device from and "wood beams" are 2×4, 2×6, 2×8 or the like, that are structured overhead wood beams.

As used herein, the term "flange" refers to the horizontal elements of the I of the I-beam. Accordingly, there is an upper flange and a lower flange, with the upright portion called the web. The lower flange has both a left and a right side, the sides on either side of the web.

As used herein, the term "a device attaching to the lower flange" refers to a device that attaches to either the left or right side, or both, of the lower flanges by any type of clamp, screw device, hook, or compression device or via the light, that attaches a device to the flange such that something of weight can be hung from the device. It also refers to attaching to a pipe or clamping around a pipe as in FIG. 3 and attaching to an overhead wood beam or clamping to a wood beam as in FIG. 5. In one embodiment, there are multiple systems hung from the rafters. In one embodiment, attachment is by a screw-driven scissor mechanism, as shown in the figures.

As used herein, the term "hanging device" refers to a device hung from the device attaching to the flange that allows or has several devices for use in the construction site. In one embodiment, there is a center pole which various devices are hung from. The length of the device, in one embodiment, is about 6, 7, or 8 foot in length.

Figure 6:
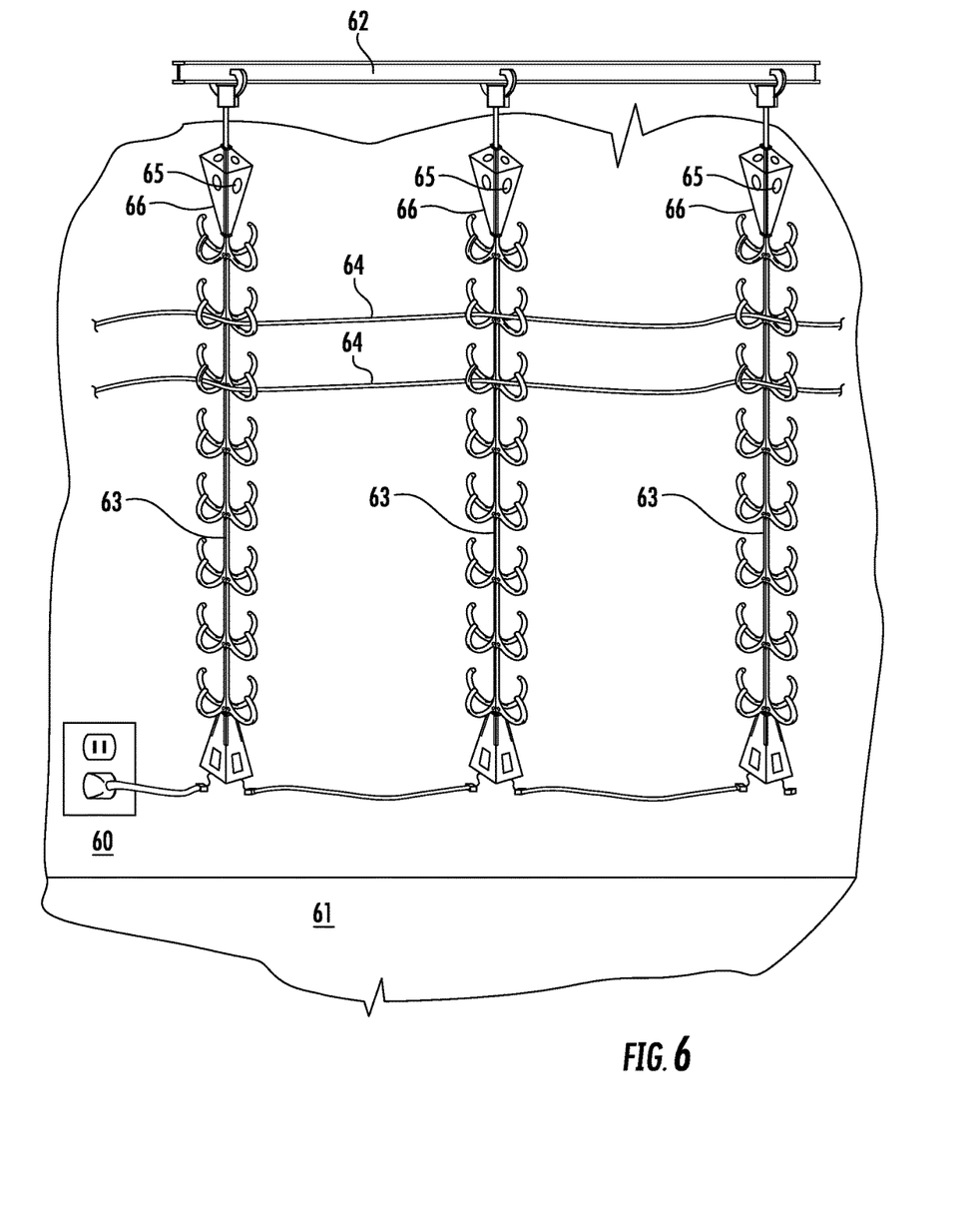
FIG. 6 is a building construction site with multiple systems holding cable.

As used herein, the term "hooks for holding cable" refers to u-shaped hooks that cables can be draped over and hold the cables off the ground, as shown in FIG. 6. There will be a plurality of these hooks based on how much room there is between the I-beam and the floor. In one embodiment, they are arranged vertically or horizontally and can be perpendicular to one another.

As used herein, the term "light" refers to an alternating current light or direct current light, for example, one or more LED lights positioned anywhere on the system. In one embodiment, the light is at either a top portion or a bottom portion or along the length.

As used herein, the term "electrical outlet" refers to an alternating current or direct current place to plug in any electrical device, such as tools and chargers and the like used in a construction site. A "device for powering the system" refers to a device that can be attached to an AC or DC power source that can power the system or provide electrical services to the user of the system.

As used herein, the term "tie off points" refers to holes provided in the system to tie things to.

As used herein, the term "power cable conduit" refers to an electrical conduit, usually attached to the I-beam, that provides live current to attach the system to power the system.

Other devices can be used on the system, such as power cords and USB receptacles, Wi-Fi hubs, speakers (used for announcements, music, etc.), communications systems and the like. In one embodiment, multiple light and cable system devices are used as a communication system. Wherein a Wi-Fi system in each light and cable system receives a broadcast message which is played through a speaker in each system. In one embodiment, lights (e.g. red) flash when there is a communication.

DRAWINGS

Figure 1:
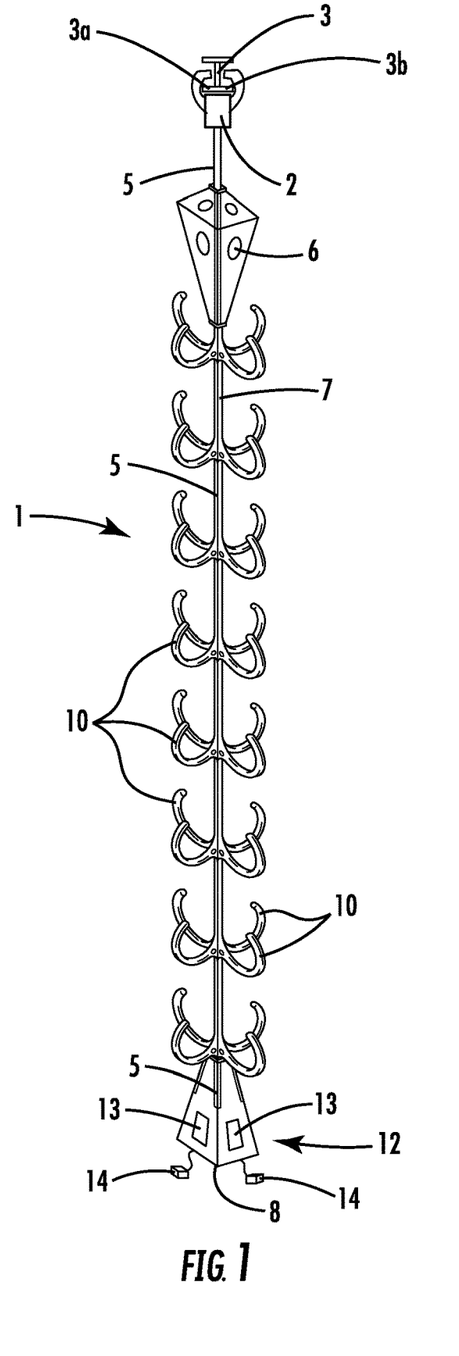
FIG. 1 is an example of the system of the present invention.

Now referring to the drawings, FIG. 1 is a perspective drawing of an embodiment of the system. Construction site light and cable system 1 consists of attaching device 2 for attaching the system to I-beam 3, either to the left 3a or right 3b flange. A center pole 5 is attached to the attaching device 2 for hanging the remaining devices of the system 1. Flood lights 6 or optional speakers and LED strip lights 7 are on the top area and along the pole, a bottom light 8 can also be utilized. In the view in this embodiment, a series of four vertical sets of hooks 10 (see FIG. 4) are arranged on the pole perpendicular from the adjoining strip. The bottom area 12 is also where optional USB ports 13 and Wi-Fi hubs, speakers, electronics, communication systems, and other items, such as power in or out cords 14 are located. In one embodiment the lights flash (e.g. red) when there is an announcement using the communication system.

Figure 2:
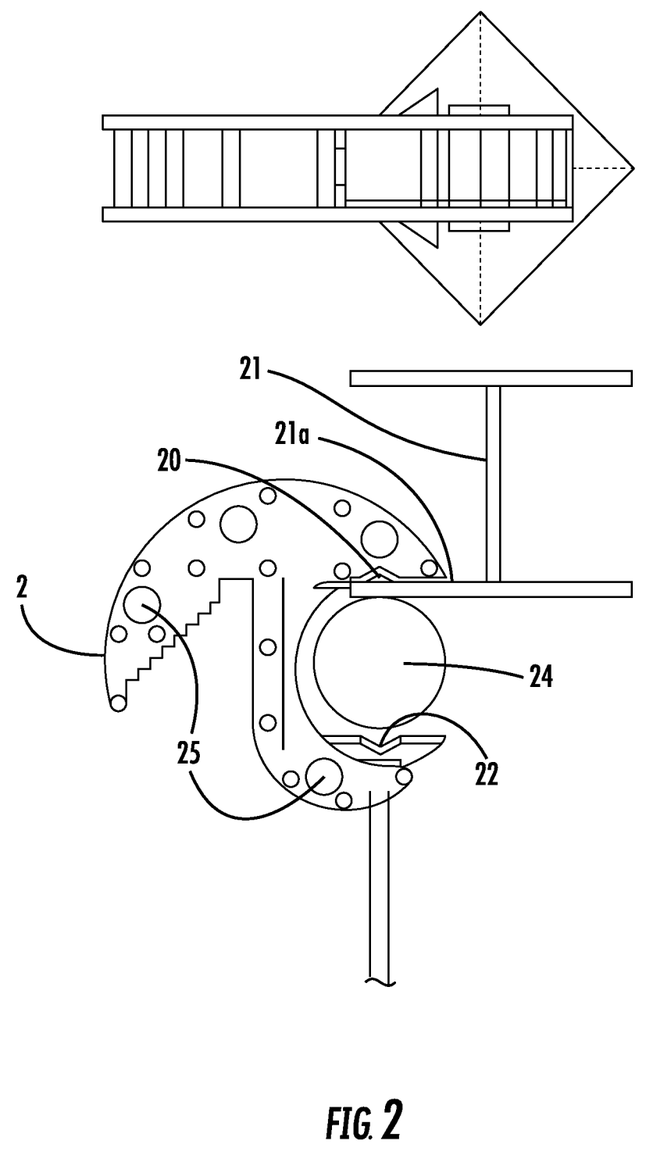
FIG. 2 is a first example of an attachment device for attaching to an I-beam lower flange.

FIG. 2 is a side view of a first embodiment of attaching device 2. In this view, upper lip 20 rests on left flange 21a of I-beam 21. Bottom lip 22 tightens upward, grabbing AC conduit 24 and holding on to both. Also shown are tie off points (holes) 25.

Figure 3:
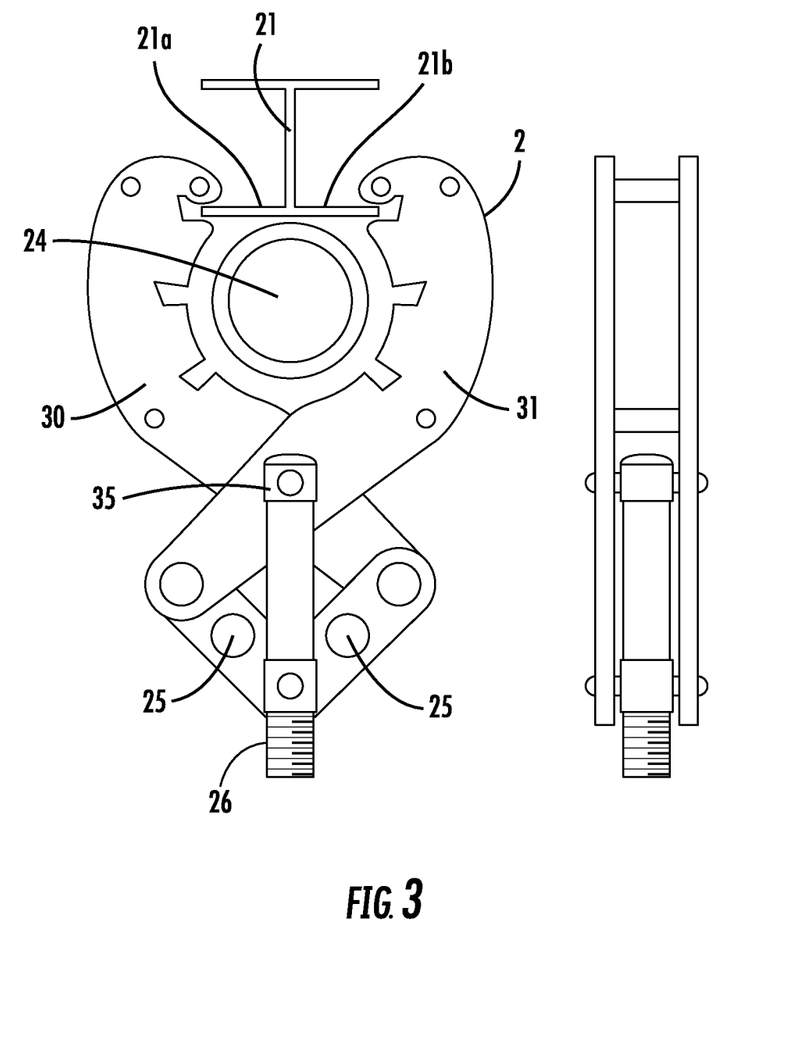
FIG. 3 is a second example of an attachment device for attaching to an I-beam lower flange.

FIG. 3 is a side view of a second embodiment of an attaching device 2. In this view, the scissor action 35 of left arm 30 and right arm 31 grab the edge of both the left 21a and right 21b flange of I-beam 21, scissor action is driven by screw drive 26. Using this method, it's possible to have a conduit pipe 24 sitting in-between the arms and grasped.

Figure 4:
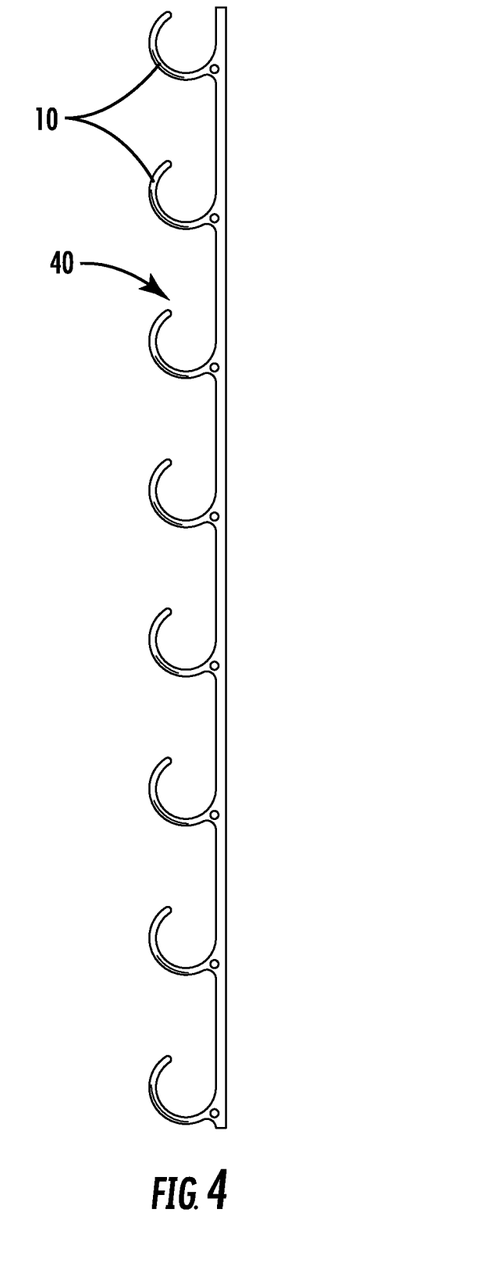
FIG. 4 is a side view of a series of vertical hooks for holding cable.

FIG. 4 shows a side view of one of four vertical hook arrangements 40 having a series of vertical hooks 10 for hanging a cord from. As shown in FIG. 1, the vertical hook arrangement 40 is mounted along the pole 5 with each arrangement 90 degrees separated from its left and right neighbors.

Figure 5:
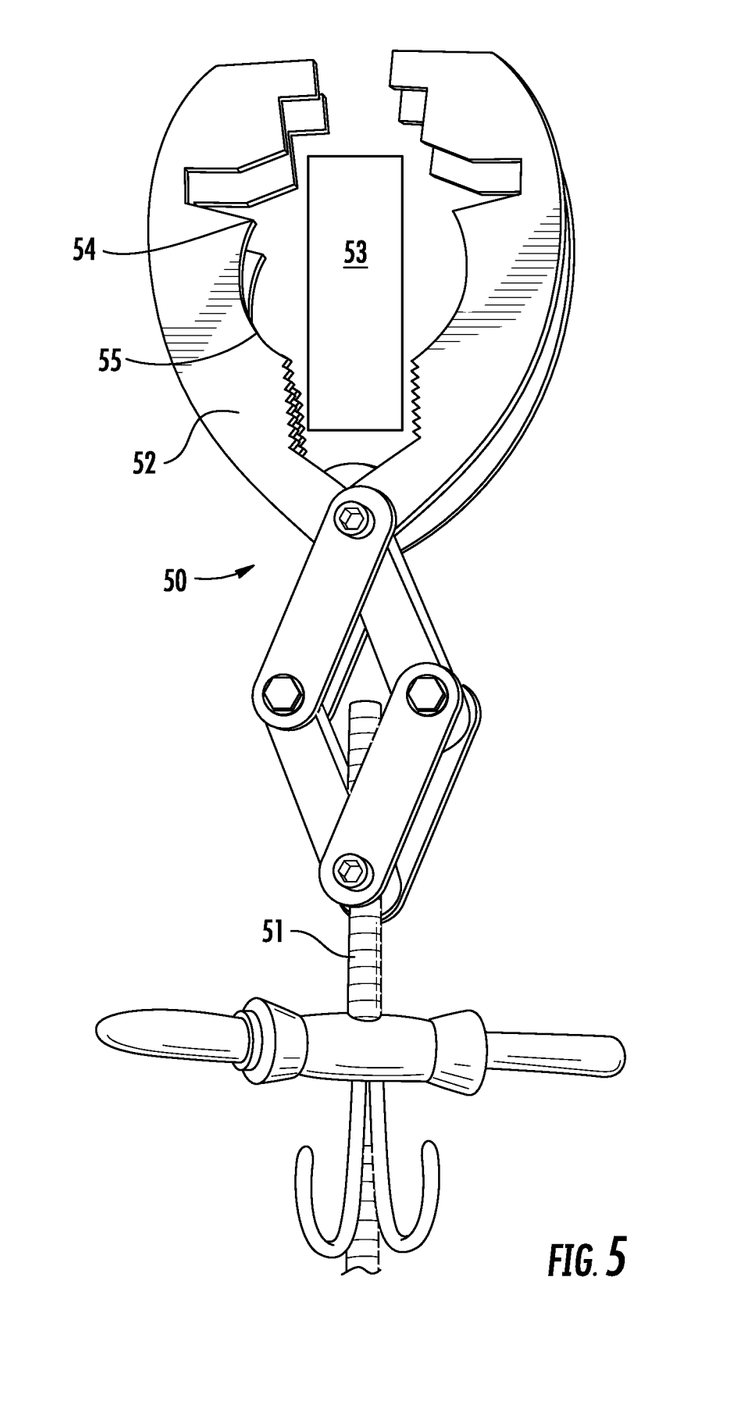
FIG. 5 is a third example of an attachment device that can attach to an I-beam, a pipe, or a wood beam.

FIG. 5 is a view of an attachment device 50 with scissor clamp 52 which is screw 51 driven. The clamp in this view is holding a wooden beam 53, but has slots 54 for grabbing an I-beam (not shown) and round containers 55 for gripping a pipe (not shown).

FIG. 6 is an embodiment showing a construction site 60 with a floor 61 and an overhead beam 62. A plurality of light and cable systems 63 with cable 64 strung between them held off the floor 61. Also, Wi-Fi system 65 and speakers 66 which act as a communication system and coordinate between multiple systems to broadcast messages at the construction site. The communication systems would then play simultaneously through each system. Therefore messages could be delivered to a construction crew wherever there was a system device with it.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A light and cable system for use in a construction site having at least one of an overhead I-beam, an overhead pipe, or an overhead wood beam, the I-beam having an upper and lower flange, the system comprising:
    a) a device for attaching the system to: at least one of the lower flange of the I-beam, the pipe and the wood beam;
    b) hanging a device from the attaching device comprising one or more each of:
        i. at least one electric light;
        ii. hooks for holding cable: and
        iii. an electric outlet;
    c) a device for adding at least one of AC or DC power to the system; and
    d) which further comprises at least one of a USB charging port, a Wi-Fi hub, or speakers.

2. The light and cable system according to claim 1 wherein the hanging device is attached to a central pole.

3. The light and cable system according to claim 1 wherein lights are attached at both a top and bottom of the system.

4. The light and cable system according to claim 1 wherein at least some of the hooks are arranged vertically.

5. The light and cable system according to claim 1 wherein the hooks are arranged perpendicular to one another.

6. The light and cable system according to claim 1 wherein the outlet is at a bottom of the system.

7. The light and cable system according to claim 1 wherein there are lights along the length of the system.

8. The light and cable system according to claim 1 which further comprises one or more power cords.

9. The light and cable system according to claim 1 wherein there are one or more tie off points on the system.

10. The light and cable system according to claim 1 wherein the attaching device attaches to a left and right side of the lower flange.

11. The light and cable system according to claim 1 wherein the attaching device attaches to one of the left and right side of the lower flange.

12. The light and cable system according to claim 1 wherein the attaching device attaches to both the I-beam and a cable conduit.

13. The light and cable system according to claim 1 wherein the attaching device attaches via a scissoring action onto the lower flange of the I-beam.

14. The light and cable system according to claim 1 wherein the attaching device attaches via a clamping action on the lower flange of the I-beam.

15. The light and cable system according to claim 1 wherein the attaching device attaches via a screw clamp which is designed to attach to any of an I-beam, a pipe or a wood beam.

16. The light and cable system according to claim 1 wherein there are a plurality of light and cable systems in a construction site.

17. The light and cable system according to claim 1 wherein the power is AC electric power.

18. The light and cable system according to claim 10 wherein the attaching device attaches to a left and right edge of the left and right side of the lower flange.

19. A light and cable system for use in a construction site having at least one of an overhead I-beam, an overhead pipe, or an overhead wood beam, the I-beam having an upper and lower flange, the system comprising:
    a) a device for attaching the system to: at least one of the lower flanges of the I-beam, the pipe, and the wood beam;
    b) hanging a device from the attaching device comprising one or more each of:
        i. at least one electric light; and
        ii. hooks for holding cable: an electric outlet;
    c) a device for adding at least one of AC or DC power to the system; and d) wherein there is an AC electrical conduit with AC power cables therein on the I-beam for attaching the system for powering the light and the outlet.

20. The light and cable system according to claim 19 wherein the hanging device is attached to a central pole.

21. The light and cable system according to claim 19 wherein lights are attached at both a top and bottom of the system.

22. The light and cable system according to claim 19 wherein at least some of the hooks are arranged vertically.

23. The light and cable system according to claim 19 wherein the hooks are arranged perpendicular to one another.

24. The light and cable system according to claim 19 wherein the outlet is at a bottom of the system.

25. The light and cable system according to claim 19 wherein there are lights along the length of the system.

26. The light and cable system according to claim 19 which further comprises one or more power cords.

27. A light and cable system for use in a construction site having at least one of an overhead I-beam, an overhead pipe, or an overhead wood beam, the I-beam having an upper and lower flange, the system comprising:
    a) a device for attaching the system to: at least one of the lower flanges of the I-beam, the pipe, and the wood beam;
    b) hanging a device from the attaching device comprising one or more each of:
        i. at least one electric light; and
        ii. hooks for holding cable: an electric outlet;
    c) a device for adding at least one of AC or DC power to the system; and
    d) which further comprises in each system a Wi-Fi communication system with speakers which play simultaneously in each of the light and cable systems.

* * * * *